L. P. McKINNEY.
SPARE TIRE HOLDER AND TRUNK SUPPORT.
APPLICATION FILED NOV. 27, 1909.
979,188.
Patented Dec. 20, 1910.
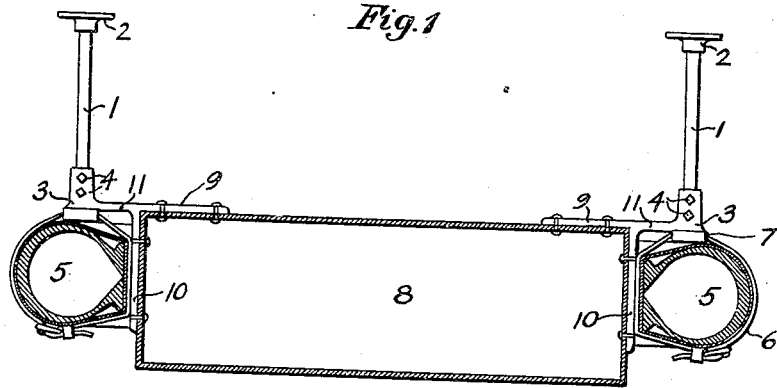
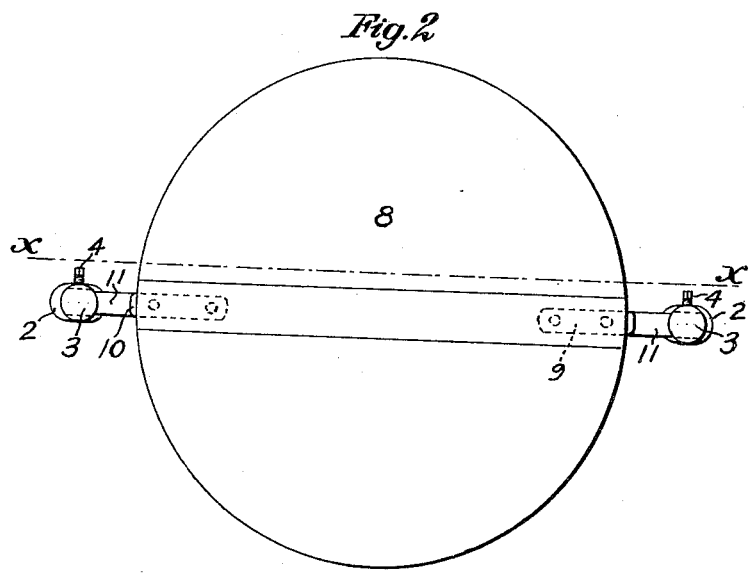
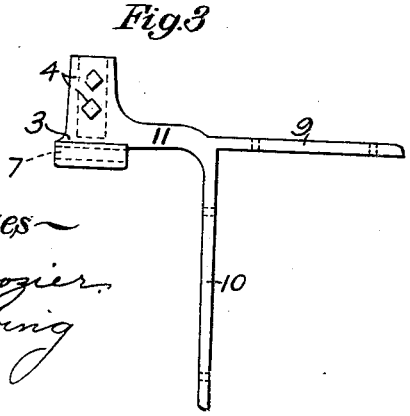
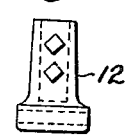
Witnesses—
Inventor—
Leo P. McKinney
by his attorney
Farnum F. Dorsey

UNITED STATES PATENT OFFICE.

LEO P. McKINNEY, OF BOSTON, MASSACHUSETTS, ASSIGNOR OF ONE-HALF TO JOHN L. SNOW, OF BOSTON, MASSACHUSETTS.

SPARE-TIRE HOLDER AND TRUNK-SUPPORT.

979,188.

Specification of Letters Patent. Patented Dec. 20, 1910.

Application filed November 27, 1909. Serial No. 530,088.

*To all whom it may concern:*

Be it known that I, LEO P. McKINNEY, a citizen of the United States, residing at Boston, in the county of Suffolk and State of Massachusetts, have invented certain new and useful Improvements in Spare-Tire Holders and Trunk-Supports, of which the following is a specification.

My invention relates to devices which are secured to automobiles or other vehicles and which are used to hold and support either a spare tire or tires or a trunk, or both tires and trunk, as occasion may demand.

The object of the invention is to produce a device of the kind above described which shall be compact and simple, and particularly to produce such a device which may be used as conveniently to carry a trunk alone as to carry both the trunk and the spare tire or tires.

In a patent granted to me Sept. 22, 1908, No. 899,126, I have disclosed a spare-tire holder comprising a stem adapted to be secured to the vehicle upon which the device is used, and a head provided with a transverse opening to receive a strap which may be passed around one or more spare tires or tire-shoes. In my present invention I preferably, though not necessarily, employ means of similar form for the attachment of the spare tires, but I combine with the head of this device means for the support of the trunk, these means being adapted to hold the trunk in the space encircled by the tires but to support it entirely independently of the tires, so that the trunk may be carried with equal convenience and security when no tires are present.

A useful feature of my present invention consists in making the head removable from the stem, both to facilitate the removal of the trunk from the vehicle and to permit the substitution of a head adapted to carry the tire or tires alone when it is not desired to carry the trunk.

The preferred embodiment of my invention is illustrated in the accompanying drawings, in which:—

Figure 1 is a plan view of two spare-tire holders and trunk supports embodying the present invention, together with a sectional view on the line *x—x* in Fig. 2 of a trunk and a spare-tire supported by said devices. Fig. 2 is a front elevation of the subject-matter of Fig. 1 without the spare-tire. Fig. 3 is a plan view of the head of one of the holding and supporting devices. Fig. 4 is a plan view of a head adapted to be substituted for that shown in Fig. 3 when tires alone are to be carried.

The illustrated embodiment of my invention comprises a stem 1 which is secured to any convenient part of the vehicle upon which the device is to be used by means of a base 2. Upon the outer end of the stem is mounted a head 3 which is removably secured in place by two set-screws 4 engaging the stem.

The spare tire or tires are secured in place by means of a strap 6 which passes around the tires and through a transverse opening 7 in the head 3, as shown in Fig. 1. By using a strap of sufficient length two or more tires or tire-shoes may be secured in this manner.

The trunk 8 is of the ordinary round form, and it is supported by means of a device extending laterally from the head 3. This device comprises two arms, of which one, designated by the numeral 9, is secured to the back of the trunk by means of rivets or other permanent fastenings, while the other arm, 10, is similarly secured to the side of the trunk. The arms 9 and 10 are offset from the head 3, by means of an extension 11, to afford space for the spare tires, when carried.

The devices just described are used in pairs, as shown in the drawings, and they thus afford a secure support for the trunk, but the tires may, if desired, be further secured by means of a holder engaging them at the bottom. As holders for this purpose are well known, I have not shown or described one in this application.

When it is desired to carry the trunk alone, the tires and the straps 6 may be removed, and the device then has the appearance of Fig. 1. If, on the other hand, it be desired to carry tires but not the trunk, the trunk may be removed by loosening the set-screws 4 and drawing the heads 3 from the stems. Heads of the form shown in Fig. 4 may then be substituted, these heads being adapted for holding tires only. The heads 12 are transversely perforated to receive the straps 6 in the same manner as in the case of the heads 3, but they are not provided with the trunk-supporting arms.

Various modifications may be made in the embodiment of my invention hereinbefore described and illustrated in the accompanying drawings, without departure from the nature of the invention as it is defined in the following claims.

I claim:—

1. A spare-tire holder and trunk support comprising a head provided with a transverse opening for the reception of a strap, a laterally-extending arm adapted to be secured to the back of a trunk, and a forwardly-extending arm adapted to be secured to the side of the trunk.

2. A spare-tire holder and trunk support comprising a stem, a head removably secured to the stem, means for connecting a trunk with the head adapted to secure the trunk at the side of the head, and means for securing a spare tire to the front of the head.

3. In combination with a circular trunk, a support therefor comprising two arms secured, respectively, to the back and the side of the trunk, a head connected with the arms and provided with a transverse opening to receive a strap, and a stem upon which the head is mounted.

4. In combination with a trunk, a support therefor comprising a head provided with a transverse opening to receive a strap, a lateral extension from the head rigidly secured to the trunk, and a stem adapted to support the head upon an automobile.

5. A spare-tire holder and trunk support comprising a head, means for securing the head to a vehicle, and a lateral extension from the head adapted to be secured to a trunk, the head being provided with a transverse opening for the reception of a strap to secure a tire.

6. A spare-tire holder and trunk support comprising a head, means for securing the head to a vehicle, means for connecting the head with a trunk adapted to secure the trunk at the side of the head, and means for securing a spare tire to the front of the head.

In testimony whereof, I affix my signature in presence of two witnesses.

LEO P. McKINNEY.

Witnesses:
ELLEN L. BARRY,
JOHN L. SNOW.